United States Patent [19]
Niedereder

[11] 3,745,266
[45] July 10, 1973

[54] ARRANGEMENT FOR MEASURING CROSS TALK PROPERTIES IN TRANSMISSION LINES

[75] Inventor: Martin Niedereder, Munich, Germany

[73] Assignee: Siemens Aktiegesellschaft, Berlin and Munich, Germany

[22] Filed: Mar. 29, 1971

[21] Appl. No.: 129,009

[30] Foreign Application Priority Data

Apr. 10, 1970 Germany .................. P 20 17 275.2

[52] U.S. Cl. .............................................. 179/175.3
[51] Int. Cl. .............................................. H04b 3/46
[58] Field of Search ...................... 179/175.3; 324/95

[56] References Cited

UNITED STATES PATENTS

| | | | |
|---|---|---|---|
| R22,620 | 3/1945 | Felch | 179/175.3 |
| 2,492,400 | 12/1949 | Robertson | 179/175.3 |

*Primary Examiner*—Kathleen H. Claffy
*Assistant Examiner*—Douglas W. Olms
*Attorney*—Hill, Sherman, Meroni, Gross & Simpson

[57] ABSTRACT

An arrangement to measure cross talk properties in transmission lines wherein an interfering line is connected to a transmitter having an adjustable frequency and the far end of an interfered line is connected to a tunable superheterodyne receiver, and a voltage measuring system is provided at the output thereof. The reading data is obtained from the cross talk voltage measured during the tuning of the superhetertodyne receiver to the transmission frequency. A superheterodyne receiver tunable to the transmission frequency can be connected to the far end of the interfering line, and tuning of the superheterodyne receiver connected to the interfered line is performed as a function of the tuning of the superheterodyne receiver connected to the interfering line.

5 Claims, 3 Drawing Figures

Patented July 10, 1973 3,745,266

ARRANGEMENT FOR MEASURING CROSS TALK PROPERTIES IN TRANSMISSION LINES

BACKGROUND OF THE INVENTION

1. Field of the Invention

This invention relates to an arrangement to measure cross talk properties in transmission lines where an interfering line is connected to a transmitter having an adjustable frequency and to the far end of an interfered line is connected a first superheterodyne receiver. A voltage measuring system is provided at the output side of the receiver and the measured data is obtained from the cross talk voltage measured during the tuning of the first superhetertodyne receiver to the transmission frequency. A second superheterodyne receiver (tunable to the transmission frequency) is connected to the far end of the interfering line and the tuning of said first superheterodyne receiver is performed as a function of the tuning of the second supeheterodyne receiver.

2. Description of the Prior Art

In the foregoing type of arrangements, it is often necessary to measure at the end of the interfered line very small cross talk voltages which have already been adulterated by noise potentials. In order to be able to perform such measurements with desired precision, it is necessary in the prior art arrangements to increase the selectivity of the first superheterodyne receiver to such an extent that the co-measured noise band becomes sufficiently narrow. From the description and the drawings of U. S. Pat. No. Re. 22,620, granted to E.P. Felch, Jr. on Mar. 20, 1945, it can be seen that the maximum selectivity which has been achieved in this typical example of prior art arrangements is determined by a band pass filter being connected into the path of the first intermediate frequency signals of the first superheterodyne receiver. More recent developments in this field require a further increase in measuring precision and therefore in selectivity, however, which cannot be obtained in this manner. If these requirements can no longer be met, the tuning of the superheterodyne transmitter to the transmission frequency cannot be attained as required for a satisfactory measurement.

SUMMARY OF THE INVENTION

The present invention has as its primary objective the provision of improving an installation of the above-mentioned kind so that the desired measuring precision is also assured in measuring small and smallest cross talk voltages.

According to the invention, the foregoing objective is realized in an arrangement for measuring cross talk properties between an interfering line and an interfered line having an adjustable frequency transmitter connected to one end of the interfering line and a first tunable superheterodyne receiver comprising a first local oscillator, the first receiver being connected to the far end of the interfered line, and a voltage measuring means connected to the output of the receiver, a second tunable superheterodyne receiver comprising a second local oscillator is connected to the far end of the interfering line and means are provided for tuning the first receiver as a function of the tuning of the second receiver. Means are also provided for utilizing the intermediate frequency of the second receiver for converting the intermediate frequency of the first receiver to a second intermediate frequency zero, and a low pass filter selectively passes the intermediate frequency zero.

A major advantage obtained with the present invention resides in particular in the fact that it is possible to measure cross talk voltages which are even smaller than the noise potentials in the first stages of the first superheterodyne receiver, as is sometimes the case when measuring cross talk on coaxial cables.

BRIEF DESCRIPTION OF THE DRAWINGS

Other objects, features and advantages of the invention, its organization, construction and operation will best be understood from the following detailed description taken in conjunction with the accompanying drawings, in which.

DESCRIPTION OF THE PREFERRED EMBODIMENTS

Figure 1:
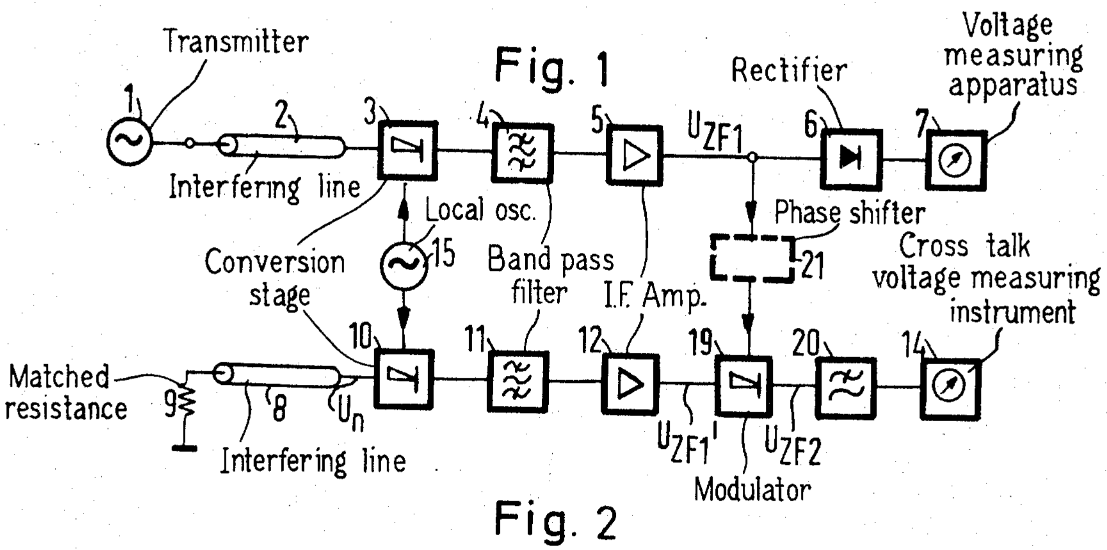
FIG. 1 illustrates a first embodiment of the invention in the form of a schematic block diagram.

In FIG. 1, a transmitter 1 is operable to provide the measuring signal and is connected to the input of an interfering line 2, whose output is connected to a selective superheterodyne receiver. The sueprheterodyne receiver comprises a conversion stage 3 with a subsequent intermediate frequency pass filter 4 and an intermediate frequency amplifier 5. The intermediate frequency amplifier 5 is followed by a rectifier arrangement 6 and a voltage indicating or voltage measuring apparatus 7.

On the transmitter end, an interfered line 8 is terminated with an impedance matched resistance 9 and at the receiving side end, where the cross talk properties occur, an additional superheterodyne receiver is connected which comprises a conversion stage 10 with a subsequent intermediate frequency pass filter 11 and an intermediate frequency amplifier 12. The tuning of the superheterodyne receiver 3–5 to the transmission frequency given by the adjustment of the transmitter 1 is accomplished with the aid of a local oscillator 15 whose frequency, hereinafter also called the superheterodyne frequency, is adjusted manually for this purpose so that the measuring apparatus 7 provides a maximum voltage reading.

The tuning of the superheterodyne receiver 10–12 following the interfered line 8 and the processing of the cross talk voltages $U_n$ are accomplished as a function of the tuning of the superheterodyne receiver (via components, 3, 4, 5 and 15) connected to the interfering line 2. For this purpose, the superheterodyne frequency fed to the conversion stage 10 is delivered in the circuit according to FIG. 1 by the local oscillator 15. In this manner, the superheterodyne receiver 10–12 is, in each case, tuned to the same frequency as the receiver which is connected to the interfering line 2.

If the portion of the measuring signal tapped from the end of the interfering line 2 falls, after the conversion, into the pass range of the intermediate frequency band pass filter 4, the cross talk potential $U_n$ received at the end of the interfered line 8 also automatically reaches, through the intermediate frequency pass filter 11, the intermediate frequency amplifier 12. Even if the cross talk potential $U_n$ is so small that it is already at the noise level, it is possible to accomplish the tuning to the transmission frequency from the transmitter 1 with the aid of the voltage indicating and/or measuring apparatus 7, which responds to the higher voltage at the output of the interfering line 2 without any problem.

The allocation of the tuning function to the superheterodyne receiver 3–5 and 15 and of the measuring function as such to the receiver 10–12 offers the possibility of differently dimensionsing the pass ranges of the intermediate frequency band pass filters 4, 11. For example, the pass range of the filter 4 may be selected larger than that of the filter 11 in order to effect, despite high selectivity and thus low insecurity of measurements, the tuning of the actual measuring circuit to the transmission frequency at lower selectivity and with greater ease.

The invention provides for the cross talk voltages $U_n$ to be converted, upon completed conversion into the first intermediate frequency position $U_{ZF1'}$ (with the aid of the intermediate frequency voltage $U_{ZF1}$ of the superheterodyne receiver which is connected to the interfering line 2) to a second intermediate frequency zero. This can be readily seen and appreciated from the embodiment presented in FIG. 1.

According to FIG. 1, the intermediate frequency voltage $U_{ZF1'}$ is fed to a modulator 19 where it is converted by means of the intermediate frequency voltage $U_{ZF1}$ of identical frequency into a second intermediate frequency zero. This process may also be called phase-controlled rectification. The band width of the intermediate frequency $U_{ZF1'}$ is cut in half thereby because two overlapping intermediate frequency semi-bands are produced which are placed, in each case, at the low end of the frequency axis, that is, they contain the second intermediate frequency zero. A subsequent low pass filter 20 is utilized to selectively pass along the DC voltage share of the modulation product which may be used directly for indicating the cross talk voltage at the instrument 14. In order to increase the selectivity of the measuring arrangement, the cut-off frequency of said low pass filter 20 is positioned as far down as possible, whereby values of 0.1 or 0.01 cycles may be taken into consideration. The increase of the selectivity, and thus of the precision of the readings may be so large that with favorable dimensioning of the cut-off frequency, cross talk voltages $U_n$ can be measured which are on a lower level than the effective value of the noise voltage present in the intermediate frequency position ($U_{ZF1'}$). In this respect, it is unnecessary to design the intermediate frequency band width of the superheterodyne receiver 10–12 correspondingly small because the resulting selectivity is determined on the basis of the cut-off frequency alone.

A phase shifter 21 is connected into the path of the intermediate frequency voltages $U_{ZF1}$ for compensating the phase shiftings of the cross talk voltages occurring during the coupling-over from the line 2 to the line 8. The setting of the phase shifter 21 is therefore advantageously effected in such a manner that a maximum reading value is attained at the voltage measuring system 14.

Figure 2:
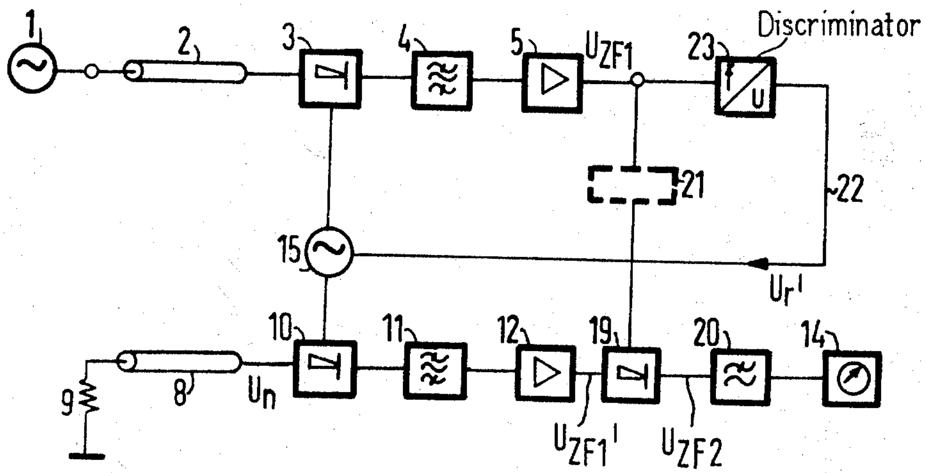
FIG. 2 illustrates another embodiment of the invention having an automatically tunable superheterodyne receiver at the end of the interfering line.

FIG. 2 illustrates an second embodiment of the invention, where a superheterodyne receiver 3–5 and 15 is automatically tuned to the transmission frequency of the transmitter 1. This is accomplished by a control circuit 22 containing a discriminator 23 connected after the intermediate frequency amplifier 5. The control circuit generates a DC control voltage $U_{r'}$ which is supplied to a frequency control input of the local oscillator 15 and so influences the tuning thereof so that the signal $U_{ZF1}$ is maintained at a predetermined theoretical value. The maximum control error admitted to the control circuit 22, for example one cycle per second or less, thereby determines the minimum band width of the intermediate frequency band pass filter 11. The evaluation of the cross talk voltages $U_n$ is accomplished in the apparatus of FIG. 2 just as in the circuit illustrated in FIG. 1.

Figure 3:
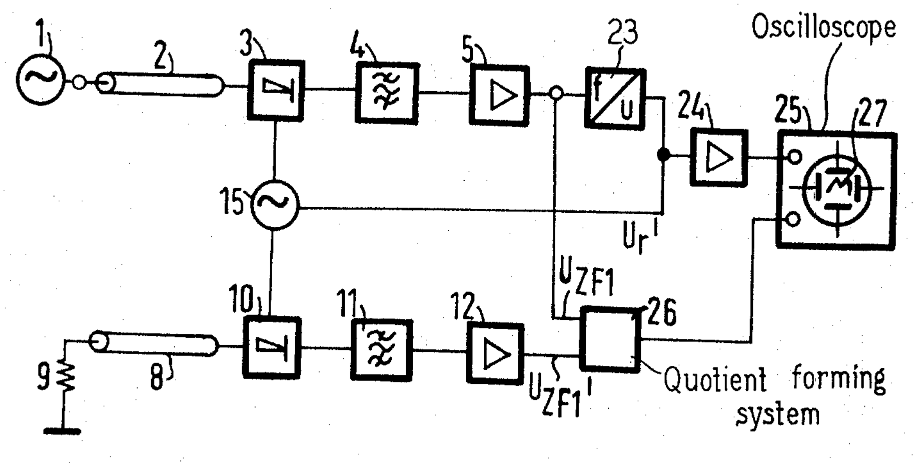
FIG. 3 illustrates yet another embodiment of the invention which is appropriate for a wobbling operation.

FIG. 3 exemplifies another embodiment of the invention which can be utilized for executing wobble measurements. With this embodiment, one may advantageously start out from a circuit according to FIG. 2 where the control voltage $U_{r'}$ is supplied after corresponding amplification in the amplifier 24 to an X-deflection system of a two-coordinate reading, viewing or recording apparatus 25, for example, of an electronic cathode ray oscilloscope, while the intermediate frequency voltages $U_{ZF1'}$ and $U_{ZF1}$ are for example supplied to a quotient-forming system 26 which delivers a DC voltage containing the measuring data to a Y-deflection system of the apparatus 25. As a result of the quotient-forming system 26, the relation of the two voltages $U_{ZF1'}/U_{ZF1}$ is obtained as a direct reading, whose logarithm is in accordance with the definition equal to the long distance cross talk attenuation. If the transmitter 1 is varied in its frequency, and in particular is periodically varied, there results therefrom, for a logarithmical scale graduation of the recording surface in Y-deflection, the cross talk attenuation as a function of the transmission frequency in the shape of an image curve as indicated at 27.

While I have described and illustrated particular embodiments of my invention, many changes and modifications thereof may be made by one skilled in the art without departing from the spirit and scope of my invention, and it is to be understood that I intend to include within the patent warranted hereon all such changes and modifications as may reasonably and properly be included within the scope of my contribution to the art.

What I claim is:

1. In an arrangement for measuring cross talk properties between an interfering line and an interfered line including an adjustable frequency transmitter connected to one end of the interfering line and a first tunable superheterodyne receiver said first receiver being connected to the far end of the interfered line, and a voltage measuring means connected to the output of the first receiver for evaluating cross talk potentials received at the far end of said interfered line, a second tunable superheterodyne receiver comprising a local oscillator, said second receiver being connected to the far end of the interfering line, means for tuning said first receiver as a function of the tuning of said second receiver, said means for tuning comprising said local oscillator as a tuning means common to both said first and second receivers, and means utilizing the intermediate frequency of said second receiver for converting the intermediate frequency of said first receiver to a second intermediate frequency zero and a low pass filter for selectively passing said intermediate frequency zero to said voltage measuring means for evaluating the cross talk potentials.

2. The arrangement of claim 1, including a phase shifting stage connected to the path of the intermediate frequency voltage of said second receiver to compensate for phase shiftings of cross talk voltages.

3. In an arrangement for measuring cross talk properties between an interfering line and an interfered line having an adjustable frequency transmitter connected to one end of the interfering line and a first tunable superheterodyne receiver, said first receiver being connected to the far end of the interfered line, and a voltage measuring means connected to the output of the first receiver for evaluating cross talk potentials received at the far end of said interfered line, a second tunable superheterodyne receiver comprising a local oscillator, said second receiver being connected to the far end of the interfering line, means for tuning said first receiver as a function of the tuning of said second receiver, said means for tuning comprising said local oscillator as a tuning means common to both said first and second receivers, and voltage measuring means connected to the output of said second receiver, wherein the selectivity of said second receiver is smaller than the selectivity of said first receiver.

4. In an arrangement for measuring cross talk properties between an interfering line and an interfered line having an adjustable frequency wobble transmitter connected to one end of the interfering line and a first tunable superheterodyne receiver, said first receiver being connected to the far end of the interfered line, and a voltage measuring means connected to the output of the first receiver for evaluating cross talk potentials received at the far end of said interfered line, a second tunable superheterodyne receiver comprising a local oscillator, said second receiver being connected to the far end of the interfering line, means for tuning said first receiver as a function of the tuning of said second receiver, said tuning means comprising a frequency discriminator connected between the output of said second receiver and said local oscillator for deriving an automatic frequency control signal, and further comprising said local oscillator as a tuning means common to both said first and second receivers, a cathode ray oscilloscope having X- and Y- deflection systems, and means for deriving X- and Y- deflection signals from said first and second receivers to indicate a function of said cross talk potentials plotted against frequency on the screen thereof, wherein said X- deflection signal is derived from said automatic frequency control signal.

5. In an arrangement for measuring cross talk properties between an interfering line and an interfered line having an adjustable frequency transmitter connected to one end of the interfering line and a first tunable superheterodyne receiver connected to the far end of the interfered line, and a voltage measuring means connected to the output of the first receiver for evaluating cross talk properties received at the far end of said interfered line, a second tunable superheterodyne receiver comprising a local oscillator, said second receiver being connected to the far end of the interfering line, means for tuning said first receiver as a function of the tuning of said second receiver, said means for tuning comprising said local oscillator as a tuning means common to both said first and second receivers, voltage measuring means connected to the output of said second receiver, said second receiver having a selectivity which is smaller than the selectivity of said first receiver, means utilizing the intermediate frequency of said second receiver for converting the intermediate frequency of said first receiver to a second intermediate frequency zero, and a low pass filter for selectively passing said intermediate frequency zero to said voltage measuring means for evaluating the cross talk potentials.

* * * * *